United States Patent [19]

Peiffer et al.

[11] Patent Number: 5,292,561
[45] Date of Patent: Mar. 8, 1994

[54] TRANSPARENT SHRINK FILM MADE FROM BIAXIALLY ORIENTED POLYPROPYLENE

[75] Inventors: Herbert Peiffer, Mainz-Finthen; Ursula Murschall, Nierstein; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 762,491

[22] Filed: Sep. 19, 1991

[30] Foreign Application Priority Data

Sep. 26, 1990 [DE] Fed. Rep. of Germany ........ 4030385

[51] Int. Cl.⁵ .............................................. B65B 53/00
[52] U.S. Cl. .................................. 428/35.1; 428/215; 428/349; 428/500; 428/516; 428/913
[58] Field of Search ...................... 428/500, 516, 913

[56] References Cited

U.S. PATENT DOCUMENTS

5,091,237 2/1992 Schloegl .............................. 428/215

FOREIGN PATENT DOCUMENTS

0348749 1/1990 European Pat. Off. .
1069450 9/1964 United Kingdom .

*Primary Examiner*—Edith Buffalow
*Attorney, Agent, or Firm*—Foley & Lardner

[57] ABSTRACT

A transparent shrink film made from propylene useful for all-round labeling of essentially cylindrical containers, such as bottles, comprises a propylene polymer and has, at 100° C., a shrinkage in the longitudinal direction of at least 10% and a shrinkage in the transverse direction of less than 2%. A process for producing the film is also provided.

22 Claims, No Drawings

TRANSPARENT SHRINK FILM MADE FROM BIAXIALLY ORIENTED POLYPROPYLENE

BACKGROUND OF THE INVENTION

The present invention relates to a transparent shrink film made from polypropylene useful for all-round labeling of essentially cylindrical containers such as bottles. The invention furthermore relates to a process for the production of this type of film.

Presently, the following two main processes for all-round labeling of essentially cylindrical containers or bottles are known:

1. A flat film is first converted into a tube or into tube sections, which is hen inverted over the bottle and subsequently shrunk onto the bottle in a shrink oven.
2. The film is processed directly from the roll, from which the film is first wound around the bottle/container and then bonded in an overlapping manner. In the subsequent shrink oven treatment, the film comes into close contact with the container.

For the first-mentioned process, a film having high shrinkage perpendicular to the longitudinal axis of the bottle is required; this direction is identical to the transverse direction of the film. For the second process, a film having increased shrinkage in the direction of winding is required; this means that shrinkage in the longitudinal direction is preferred.

The present invention relates to a film which is especially suitable for use in the second process. The instant film simultaneously achieves high longitudinal shrinkage and .slow transverse shrinkage throughout the relevant temperature range.

At present, films useful in the second process usually comprise polyvinyl chloride or polystyrene and are generally stretched longitudinally. Both of these materials have disadvantages. Specifically, the relatively high price due to the high density of the polyvinyl chloride, and the high formulation price for the glass-clear form of the polystyrene.

Other materials, for example biaxially oriented polypropylene, have hitherto not been employed to any great extent for the above application. In the case of biaxially oriented polypropylene, it is theoretically possible to achieve the desired shrink properties in the longitudinal direction by using only longitudinal stretching. However, this film has the disadvantage of poor mechanical properties. A relatively large film thickness is therefore necessary for processing on fast-running machines such as at 600 units/minute, which is customary today. The relatively thick film is relatively cloudy and non-glossy, which adversely affects the appearance. In addition, a purely longitudinally stretched film tends to split in the longitudinal direction, an effect which is extremely undesired during processing. In addition, a longitudinally stretched film also has the general property of expanding in the transverse direction, i.e., in the direction perpendicular to the shrink direction, under the action of heat. This property can result in the label projecting beyond the edge of the container.

SUMMARY OF THE INVENTION

The object of the present invention is to develop a transparent, readily bondable multilayer all-round labeling film which is readily shrinkable in the longitudinal direction, is based on polypropylene, has very good optical and mechanical properties and has technical and economical advantages over films of the prior art. In addition, the film should not change its dimension in the transverse direction when subjected to the shrinking process.

This object is achieved by providing a film comprising as principal constituent, i.e., more than about 50% by weight of the film, a propylene polymer, wherein the film has, at 100° C., a shrinkage in the longitudinal direction of at least 10% and a shrinkage in the transverse direction of less than 2%.

There is further provided a film containing a mixture of the propylene polymer and a hydrogenated hydrocarbon resin.

It is another object of the invention to provide a multilayer film, wherein the outer layers independently comprise propylene homopolymer or ethylene-propylene copolymer, and the base layer comprises a polypropylene polymer, wherein the film has at 100° C. a shrinkage in the longitudinal direction of at least about 10% and a shrinkage in the transverse direction of less than about 2%.

There is also provided a process for providing the film which comprises the steps of:

a) producing a pre-film of propylene polymer by extrusion or co-extrusion in a flat film die;

b) compacting the pre-film on a chill roll so as to form a film;

c) longitudinally stretching the film; and d) transversely stretching the longitudinally stretched film.

It is also an object to provide a container comprising the polypropylene film as a label.

Further objects, features, and advantages of the invention will become apparent from the detailed description of preferred embodiments that follow.

DETAILED DESCRIPTION OF THE PREFERRED EMBODIMENTS

The propylene polymer according to the invention is preferably an isotactic polypropylene having an n-heptane-soluble content of about 15% by weight or less. Isotactic polypropylenes having an n-heptane soluble content of about 2 to about 6% by weight are particularly preferred. Suitable propylene polymers have a preferred melt flow index of about 0.5 g/10 min to about 8 g/10 min at 230° C. and a load of 21.6N (determined in accordance with DIN 53 735), most preferably about 1.5 g/10 min to about 4 g/10 min.

In a preferred embodiment, the film according to the invention contains the propylene polymer in an amount of about 60 to about 95% by weight and in addition contains a hydrogenated hydrocarbon resin preferably having a softening point in the range of about 130° to about 180° C. in an amount of about 5 to about 40% by weight, the percentages being based on the total weight of the mixture of propylene polymer and hydrogenated hydrocarbon resin. The hydrocarbon resin preferably present in the film is a low-molecular-weight synthetic resin which has a softening point in the preferred range of about 130° to about 160° C., determined in accordance with ASTM E28. The number average of the molecular weight preferably ranges between 200 and 1000. Hydrocarbon resins of this type are preferably formed from resin-forming compounds such as styrene, methylstyrene, vinyltoluene, indene, pentadiene, cyclopentadiene and the like. Hydrogenated resins, in particular hydrogenated cyclopentadiene resin, are preferred according to the invention. The Saybold color number of these hydrocarbon resins (in accordance with ASTM D 158) is preferably greater than about 20, most preferably greater than about 25.

In a further preferred embodiment of the invention, the film is a multilayer film comprising outer layers of propylene homopolymers or ethylenepropylene copolymers on both sides of the base layer described above.

If the outer layers comprise propylene homopolymers, it is preferred for the propylene homopolymer employed to have a higher melt flow index than that of the base polypropylene layer. In addition, it is preferred that approximately the same resin proportions be present in the outer layer as in the base layer.

The propylene polymer in the outer layers is preferably an isotactic polypropylene having an n-heptane-soluble content of about 15% by weight or less, isotactic polypropylenes having a n-heptane-soluble content of about 2 to about 6% by weight being particularly preferred. Suitable propylene polymers for the outer layers preferably have a melt flow index in the range of about 5 to about 20 g/10 min.

The resin present in the outer layers may be the same resin as present in the base layer.

If an ethylene-propylene copolymer is chosen as the outer layer, the film is additionally heat-sealable, which is advantageous for certain applications. The melt flow indexes should again be balanced in such a manner that the material in the outer layer is more readily freeflowing than that in the base layer.

Ethylene-propylene copolymers which are suitable for the outer layers are preferably random copolymers and have a preferred ethylene content in the range of about 2 to about 10% by weight, most preferably about 3 to about 6% by weight.

The outer layers preferably contain an inorganic or organic antiblocking agent. Suitable antiblocking agents are inorganic additives, for example silicon dioxide, calcium carbonate or the like. The mean particle size of the antiblocking agent is preferably between about 1.5 and about 3 $\mu$m and its aspect ratio is preferably less than about 3. The aspect ratio of the antiblocking agent represents the ratio between the greatest surface area and the standardized thickness of the particles. According to this definition, a cubic antiblocking agent has an aspect ratio of 1. The refractive index of the antiblocking agent is preferably between 1.4 and 1.6 $SiO_2$ and calcium carbonate are preferred antiblocking agents. The amount added is preferably about 0.1 to about 0.5% by weight of the layer.

In order to further improve certain properties of the shrink film according to the invention, in particular the running behavior of the film during production or processing, the base and/or outer layers may contain suitable additives in effective amounts to obtain the desired improvement. Preferably used are antistatics and/or lubricants.

Preferred antistatics include essentially straight-chain and saturated, aliphatic, tertiary amines containing an aliphatic radical having 10 to 20 carbon atoms and substituted by $\omega$-hydroxy-($C_1$-$C_4$)-alkyl groups, amongst which N,N-bis(2-hydroxyethyl)alkylamines containing $C_{10}$-$C_{20}$-, preferably $C_{12}$-$C_{18}$-alkyl groups are particularly preferred. The effective amount of antistatic is generally in the range of about 0.05 to about 0.2% by weight, based on the layer.

Examples of preferred lubricants include higher aliphatic acid amides, higher aliphatic acid esters, waxes, metal soaps, and polydimethylsiloxane. The effective amount of lubricant is generally in the range of about 0.1 to about 2% by weight, based on the weight of the layer. The addition of higher aliphatic acid amides, for example erucamide, preferably in an amount of about 0.15 to about 0.25% by weight, in the base layer and/or top layers has proved particularly suitable. Also, very good results are achieved by adding polydimethylsiloxane to one or both outer layers. The amount added is preferably in the range of about 0.3 to about 1.5% by weight of the layer; the viscosity of the polydimethylsiloxane is preferably between about 1000 and about 100,000 $mm^2/s$.

The overall thickness of the film according to the invention is preferably in the range of about 10 to about 50 $\mu$m, most preferably about 20 to about 45 $\mu$m. The outer layers have a preferred thickness of about 0.2 to about 0.7 $\mu$m.

The film according to the invention has particularly desirable shrink properties. It has a shrink capacity of greater than about 10% at 100° C. and greater than about 20% at 120° C. in the longitudinal direction and at the same time a shrink capacity of less than 2% at 100° C. and less than 10% at 120° C. in the transverse direction, the percentages in each case being based on the respective length of the film before the shrinking process. Each of the shrink values indicated was determined in a circulating-air oven for a time of 15 minutes in accordance with DIN 406 34. The shrink capacity of the film according to the invention is preferably in the range of about 14 to about 18% at 100° C. and about 25 to about 30% at 120° C. int he longitudinal direction and 0° to about 2% at 100° C. and about 3 to about 7% at 120° C. in the transverse direction, the percentages in each case are based on the length of the film before the shrinking process.

In addition to the above-described shrink properties, the film according to the invention also has particularly advantageous mechanical properties. The modulus of elasticity is determined in accordance with DIN 53 455 using a type 1445 tensile stress tester from Messrs. Zwick in Ulm, Germany. The film according to the invention has a modulus of elasticity in the longitudinal direction of greater than about 2800 $N/mm^2$, preferably about 3000 to 3300 $N/mm^2$, and a modulus of elasticity in the transverse direction of greater than about 2500 $N/mm^2$, preferably of about 2800 to about 3300 $N/mm^2$.

Another physical parameter which illustrates the mechanical properties of the film according to the invention is the tear strength, which is determined in accordance with DIN 53 455. The shrink film of the invention has a tear strength in the longitudinal direction of greater than about 710 $N/mm^2$, preferably in the range of about 180 to about 200 $N/mm^2$, and in the transverse direction of greater than about 150 $N/mm^2$, preferably in the range of about 160 to about 180 $N/mm^2$.

The optical properties of the film according to the invention are excellent. The gloss is in the range of about 110 to about 130, determined in accordance with DIN 67 530 or ASTM-D 523, and the haze of the film is less than about 20%, preferably from about 10 to about 15%. The haze of the film is measured in accordance with ASTM-D 1003-52 but instead of a 4° pinhole diaphragm, a 1° slit diaphragm is used, and the haze is indicated in percent for four film layers placed one on top of the other. The four layers were selected since the optimum measuring range is thereby utilized. The high gloss of the film according to the invention is particularly attractive and therefore a particular area of application of the film according to the invention is where the product, i.e., can, bottle, dispenser, or the like, is subject to high visual demands.

The film can be made by any known process which will produce a film having the above-described parameters. A preferred process is described below. The preferred process comprises first producing a prefilm by extrusion or coextrusion in a flat film die, then solidifying the prefilm on a chill roll and subsequently orienting the film in the longitudinal and transverse directions by stretching. The longitudinal stretching conditions are chosen so that the longitudinally stretched film is highly oriented. The prerequisites for achieving high longitudinal shrinkage and low transverse shrinkage are then particularly favorable. A customary parameter for assessing the extent of orientation of the longitudinally stretched film is the birefringence $\Delta n$. The film according to the invention is distinguished by the fact that the birefringence of the longitudinally stretched, but as yet transversely unstretched film exceeds a value of about equal to $25 \times 10^{-3}$ for $\Delta n$. The birefringence $\Delta n$ should preferably be greater than $30 \times 10^{-3}$. The longitudinal stretching is carried out at a preferred temperature of less than about 110° C., most preferably in the range from about 90° to about 105° C., and at a preferred stretching ratio of greater than about 6.5, most preferably in the range from about 7.5 to about 8.5.

Preferred transverse stretching temperatures are in the range of greater than about 140° C., most preferably about 145°-150° C. The transverse stretching ratio should preferably not exceed a value of about 8:1. A range of less than about 7:1 is most preferred.

Stretching of the film in the transverse direction is followed by a final fixing step. In this step, the film is passed further in the tenter frame, in a converging manner, at a temperature of about 20° to about 40° C. below the stretching temperature, in particular at a temperature below about 130° C., preferably below about 120° C. Through the convergence, a further increase in the longitudinal shrinkage (at the expense of transverse shrinkage) was surprisingly observed.

The printability and bondability of the film are achieved by one of the conventional surface treatments before winding up, for example flame treatment or electrical corona treatment. The flame treatment is preferred here if the outer layers comprise PP homopolymer. For outer layers comprising PE/PP copolymer, either of the two processes can be employed. The treatment intensities are within the usual limits. Treatment intensities of about 38 to about 42 mN/m are preferred.

The shrink film produced in this way has a combination of properties which makes it particularly suitable for its intended use as a film for all-round labeling. Its preferred area of use is in particular where the shape of the can or bottle varies by less than 10% in the region where the label is applied.

The film according to the invention described above in all details is illustrated in yet more detail below by means of an illustrative embodiment.

EXAMPLE

A multilayer film comprising a base layer made from 80% by weight of isotactic polypropylene and 20% by weight of hydrogenated cyclopentadiene resin and having a softening temperature of 140° C. and outer layers made from isotactic polypropylene admixed with 0.3% by weight of a $CaCO_3$ having a mean particle size of 2 $\mu m$ and an aspect ratio of 1, 0.5% by weight of N,N-bisethoxyalkylamine (Armostat $^{(R)}$300) and 0.5% by weight of polydimethylsiloxane (viscosity 30,000 cSt) was produced via the process steps coextrusion, cooling, longitudinal stretching, transverse stretching and fixing. The overall thickness of the film was 40 $\mu m$, the outer layers each being about 0.5 $\mu m$ thick. The production conditions in the individual process steps were:

Extrusion: Melt temperature 220° C. Take-off roll temperature 60° C.

Longitudinal stretching: Temperature T=100° C. Longitudinal stretching ratio $\lambda$=7.5

Transverse stretching: Temperature T=150° C. Transverse stretching ratio $\lambda t$=6.5

Fixing: Temperature T=120° C. Time t=1 s Convergence=20%

The film produced in this way had the properties listed in the table. The film was subjected, before winding up, to flame treatment in order to ensure printability and bondability. The treatment intensity was 39 mN/m.

The table compares the film according to the invention with a monoaxially oriented PP film. A comparison of the reported properties shows that the film according to the invention is considerably superior to the monoaxially stretched film, in particular with respect to the property combination aimed at according to the object of the invention.

TABLE 1

| Film | Shrinkage [%] 15 min in air long./transv. | | Modulus of elasticity [N/mm$^2$] | | Tear strength [N/mm$^2$] | | Haze % | Gloss |
|---|---|---|---|---|---|---|---|---|
| | 100° C. | 120° C. | long. | transv. | long | transv. | | |
| Film according to the invention | 15/2 | 25/8 | 3200 | 3100 | 190 | 200 | 15 | 120 |
| Monoaxially stretched film | 20/−2 | 35/−4 | 2200 | 120 | 160 | 80 | 40 | 80 |

What is claimed is:

1. A film comprising a propylene polymer, wherein said film has at 100° C. a shrinkage in the longitudinal direction of at least about 10% and a shrinkage in the transverse direction of less than about 2%.

2. A film as claimed in claim 1, wherein said propylene polymer is an isotactic polypropylene having an n-heptane-soluble content of about 15% by weight or less.

3. A film as claimed in claim 2, wherein said isotactic polypropylene has an n-heptane-soluble content of about 2 to about 6% by weight.

4. A film as claimed in claim which contains the propylene polymer in an amount of from 60 to 95% by weight of the film.

5. A film as claimed in claim 4, which additionally comprises about 5 to about 40% by weight of a hydrogenated hydrocarbon resin having a softening point in the range from about 130° to about 180° C., the percentages being based on the total weight of the polypropylene/hydrocarbon resin mixture.

6. A film as claimed in claim 5, wherein said hydrogenated hydrocarbon resin is a low-molecular-weight synthetic resin which has a softening point in the range of about 130° to about 160° C., determined in accordance with ASTM E28.

7. A film as claimed in claim additionally comprising outer layers on both sides of said film, independently comprised of a propylene homopolymer or ethylene-propylene copolymer, the outer layers may contain up to 40 % by weight of the individual outer layer of a low molecular weight resin.

8. A film as claimed in claim 7, wherein one or both of the outer layers additionally comprises an antiblocking agent.

9. A film as claimed in claim 8, wherein said antiblocking agent comprises silicon dioxide or calcium carbonate, each having a mean particle size of between about 1.5 and about 3 μm and present in an amount of about 0.1 to about 0.5% by weight of the outer layer.

10. A film as claimed in claim 1, having an overall thickness in the range of about 10 to about 50 μm.

11. A film as claimed in claim 1, which has a shrink capacity of greater than about 10% at 100° C. and greater than about 25% at 120° C. in the longitudinal direction and a shrink capacity of less than about 2% at 100° C. and less than about 10% at 120° C. in the transverse direction, the percentages being based on the respective length extension of the film before the shrinking process.

12. A film as claimed in claim 1, which has a modulus of elasticity in the longitudinal direction of greater than about 2800 N/mm$^2$, and a modulus of elasticity in the transverse direction of greater than about 2500 N/mm$^2$.

13. A film as claimed in claim 12, wherein said modulus of elasticity in the longitudinal direction is about 3000 to about 3300 N/mm$^2$, and wherein said modulus of elasticity in the transverse direction is about 2800 to about 3300 N/mm$^2$.

14. A film as claimed in claim 1, which has a tear strength in the longitudinal direction of greater than about 170 N/mm$^2$, and in the transverse direction of greater than about 150 N/mm$^2$.

15. A film as claimed in claim 14, wherein said tear strength in the longitudinal direction is about 180 to about 200 N/mm$^2$ and wherein said tear strength in the transverse direction is about 160 to about 180 N/mm$^2$.

16. A film as claimed in claim 1, wherein said film is a transparent shrink film for shrink-wrap labeling of substantially cylindrical containers.

17. A film as claimed in claim 7, having an overall thickness in the range of about 10 to about 50 μm, wherein the outer layers each have a thickness of about 0.2 to about 0.7 μm.

18. A film as claimed in claim 1, wherein the film consists essentially of polypropylene.

19. A film as claimed in claim 7, wherein the outer layers comprise a polypropylene having a higher melt flow index than the polypropylene of the base layer.

20. A film as claimed in claim 7, wherein the outer layers are heat-sealable and comprise an ethylenepropylene copolymer containing about 2 to about 10% by weight of ethylene.

21. A film as claimed in claim 1, which has a shrink capacity of about 14 to about 18 at 100° C. and about 25 to 30% at 120° C. in the longitudinal direction and about 0 to about 2% at 100° C. and about 3 to about 7 at 120° C. in the transverse direction.

22. A film as claimed in claim 5, which consists essentially of polypropylene and said hydrogenated hydrocarbon resin.

* * * * *